United States Patent
Lindel et al.

(10) Patent No.: US 10,804,683 B2
(45) Date of Patent: Oct. 13, 2020

(54) COVER PLATE FOR A HOUSEHOLD APPLIANCE AND HOUSEHOLD APPLIANCE AND METHOD FOR ASSEMBLY OF A COVER PLATE

(71) Applicant: BSH HAUSGERAETE GMBH, Munich (DE)

(72) Inventors: Andreas Lindel, Heidenheim (DE); Michael Krapp, Nattheim (DE); Yun Dai, Elchingen (DE)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 16/328,742

(22) PCT Filed: Sep. 8, 2017

(86) PCT No.: PCT/EP2017/072609
§ 371 (c)(1),
(2) Date: Feb. 27, 2019

(87) PCT Pub. No.: WO2018/059911
PCT Pub. Date: Apr. 5, 2018

(65) Prior Publication Data
US 2019/0214802 A1 Jul. 11, 2019

(30) Foreign Application Priority Data
Sep. 28, 2016 (DE) ........................ 10 2016 218 636

(51) Int. Cl.
*H02G 3/04* (2006.01)
*H01R 13/73* (2006.01)
(Continued)

(52) U.S. Cl.
CPC ......... *H02G 3/0418* (2013.01); *F25D 23/028* (2013.01); *H01R 13/73* (2013.01);
(Continued)

(58) Field of Classification Search
CPC ... H02G 3/0418; F25D 2400/40; F25D 23/06; F25D 2323/122; F25C 2400/14
(Continued)

(56) References Cited

U.S. PATENT DOCUMENTS

| 4,820,189 A | 4/1989 | Sergeant et al. |
| 6,065,820 A | 5/2000 | Fleissner et al. |

(Continued)

FOREIGN PATENT DOCUMENTS

| DE | 7630077 U1 | 6/1977 |
| DE | 29513209 U1 | 1/1997 |

(Continued)

*Primary Examiner* — Sherman Ng
(74) *Attorney, Agent, or Firm* — Laurence A. Greenberg; Werner H. Stemer; Ralph E. Locher

(57) ABSTRACT

An integral or one-piece cover plate for a household appliance includes at least one integrated cable duct for an electrical cable, which is constructed to be open to a top side of the cover plate in the circumferential direction about a longitudinal duct axis. The cover plate additionally has at least one hose duct for a hose. A household appliance and a method for assembly of a cover plate are also provided.

20 Claims, 8 Drawing Sheets

(51) Int. Cl.
*F25D 23/02* (2006.01)
*F25D 23/06* (2006.01)

(52) U.S. Cl.
CPC .......... *F25C 2400/14* (2013.01); *F25D 23/06* (2013.01); *F25D 2323/122* (2013.01); *F25D 2400/40* (2013.01)

(58) Field of Classification Search
USPC ...................................................... 174/520
See application file for complete search history.

(56) References Cited

U.S. PATENT DOCUMENTS

| | | | |
|---|---|---|---|
| 9,713,414 | B2 | 7/2017 | Beshears, Jr. et al. |
| 2004/0107740 | A1 | 6/2004 | Kim et al. |
| 2005/0284159 | A1 | 12/2005 | Kim |
| 2006/0064846 | A1* | 3/2006 | Espindola ............ E05D 11/0081 16/223 |
| 2007/0204647 | A1 | 9/2007 | Puthiyaveetil et al. |
| 2007/0204648 | A1* | 9/2007 | Smale ................... F25D 23/126 62/389 |
| 2009/0229297 | A1 | 9/2009 | Allard et al. |
| 2010/0148644 | A1 | 6/2010 | Poyner et al. |
| 2010/0212957 | A1* | 8/2010 | Hotz ................... A47L 15/4251 174/72 A |
| 2010/0293987 | A1 | 11/2010 | Horst et al. |
| 2013/0133354 | A1* | 5/2013 | Park ........................ F25D 11/00 62/340 |
| 2014/0270724 | A1* | 9/2014 | Hall ...................... F25D 23/028 392/341 |
| 2014/0373885 | A1* | 12/2014 | Beshears, Jr. ....... A47L 15/4246 134/57 D |
| 2015/0247665 | A1 | 9/2015 | Allard et al. |

FOREIGN PATENT DOCUMENTS

| | | |
|---|---|---|
| DE | 69506806 T2 | 8/1999 |
| DE | 29724106 U1 | 1/2000 |
| DE | 102014105830 A1 | 12/2014 |
| EP | 0243632 A2 | 11/1987 |
| EP | 0321286 A1 | 6/1989 |
| JP | S56126882 U | 9/1981 |
| JP | 2000070589 A | 3/2000 |

* cited by examiner

COVER PLATE FOR A HOUSEHOLD APPLIANCE AND HOUSEHOLD APPLIANCE AND METHOD FOR ASSEMBLY OF A COVER PLATE

BACKGROUND OF THE INVENTION

Field of the Invention

The invention relates to a cover plate for a household appliance which is integrally designed and has at least one integrated cable duct for an electrical cable, which is designed to be at least partially open in the circumferential direction about a longitudinal duct axis to a top side of the cover plate. The invention further relates to a household appliance with such a cover plate and a method for assembly of a corresponding cover plate.

It is known that a plurality of electronics units are installed in household appliances. These electronics units have to be supplied with electrical energy so that corresponding electrical cables and thus also electrical lines are laid in the household appliance and in this context also conducted toward these electronics units. These electrical cables are also designed for transmitting data between such an electronics unit and, for example, a control unit of the household appliance.

Thus in a household refrigeration appliance it is also known, for example, that an electronics display unit which has to be correspondingly connected to electrical cables is arranged in the upper region and on the front side of the housing.

To this end, for example, a plate-like housing cover is provided in DE 295 13 209 U1, cable ducts being configured to be integrated therein. Electrical cables which are conducted to an electronics compartment are thus laid in these cable ducts, said electronics compartment also being designed to be integrated in this housing cover. Electronics units such as a printed circuit board with control elements and display elements may be arranged in this electronics compartment.

SUMMARY OF THE INVENTION

It is the object of the present invention to provide a cover plate for a household appliance which is designed to be more functional relative to receiving components. It is also the object of the invention to provide a corresponding household appliance and a method for assembly of a cover plate.

This object is achieved by a cover plate, a household appliance and a method as claimed in the independent claims.

A cover plate according to the invention for a household appliance is integrally designed and has at least one integrated cable duct, which is designed to receive an electrical cable. The cable duct is designed to be open in the circumferential direction about a longitudinal duct axis of this cable duct to a top side of the cover plate and relative thereto is correspondingly designed to be at least partially open along the longitudinal axis. An essential idea of the invention is that, additionally to this cable duct, the cover plate has at least one hose duct which is designed for receiving a hose. A hose is designed for conducting a medium, in particular a gaseous or liquid medium.

By means of such an embodiment of a cover plate, this cover plate is configured to be more adaptable and more multi-functional in order to receive other elongated components. Even in household appliances which in addition to electronics components also have at least one water-conducting subassembly, it is thus possible to receive and supply very different line connections relative to very different functional units via this single cover plate which is integrally designed. The cover plate thus also forms a carrier for functionally different supply lines, whereby these supply lines may also be provided and laid so as to be locally bundled in the household appliance. As a result, the assembly effort is reduced and, in particular, a corresponding simplification is also achieved for subsequent maintenance operations since this local focusing of the layout of different lines and/or supply lines provides improvements relative to the locating and the accessing thereof.

In particular, it is provided that the hose duct is designed to be open in the circumferential direction about a longitudinal duct axis of this hose duct to a top side of the cover plate. By means of this embodiment, the layout and/or assembly of a hose in the cover plate is simplified and also at any time correspondingly permits accessibility to an at least partial length of the hose via the top side. This opening of the hose duct to the top side of the cover plate specifically promotes the assembly thereof and also maintenance operations. This is because in the installed state of the cover plate the top side is remote from the interior of the household appliance, so that accessibility to the ducts which are open to the top side is thus instantly provided and, therefore, only a small effort is required for dismantling the other components of the household appliance.

Moreover, by such an embodiment of a duct, a channel-like duct shape is also formed which, on the one hand, permits a comprehensive reception of a supply line, in particular an electrical cable or a hose, and which receives said supply line in a recessed manner, so that the respective supply line is arranged therein in a protected manner. Moreover, by this opening to the top it is possible for the supply line to be fully seated and remain in the downwardly closed design of a duct, solely by the weight force of the supply line, so that an electrical cable or a hose is prevented from undesirably slipping out or undesirably protruding upwardly out of a duct.

Preferably, it is provided that a plurality of cable ducts and a plurality of hose ducts are configured. As a result, in particular, many different functional units of a household appliance may be supplied with supply lines via a single cover plate. The compact nature of the entire construction and a very advantageous and clear layout of multiple supply lines, whether they are electrical cables or hoses, are permitted thereby.

Preferably, it is provided that at least two cable ducts and/or at least two hose ducts lead into a first duct hole which is set back relative to the edges of the cover plate. This duct hole, which is integrated in the cover plate and configured at that point, preferably has a hole axis which is oriented perpendicular to the plane in which the cover plate extends. By means of such a duct hole, it is achieved in a particularly advantageous manner that a plurality of supply lines lead into said duct hole, said supply lines thus being conducted very centrally through the cover plate. Such a duct hole thus permits a plurality of lines to be laid through a single hole from one side of the cover plate to the opposing side of the cover plate. Moreover, the assembly of a plurality of supply lines is simplified thereby and the management of the layout of the supply lines is particularly clear.

The duct hole is fully closed when viewed circumferentially around the hole axis, so that this duct hole is defined in a fully circumferential manner by a duct hole wall. In particular, the duct hole is designed with a hole contour which, in particular, is designed to be circular without corners, circulating around the hole axis. It is possible to receive a plurality of supply lines thereby in a particularly varied manner, said supply lines being able to be bundled together in a particularly compact manner and being able to be conducted through the duct hole with its specific geometry. Moreover, the prevention of undesired pressure points on a supply line is achieved by this contour, so that abrasion points or kinking points on a supply line may be avoided in the region of the duct hole.

Preferably, it is provided that the first duct hole has a diameter which is designed at least for conducting through all of the cables and/or all of the hoses which may be conducted via all of the cable ducts and/or all of the hose ducts to the first duct hole. By such a dimensioning of the duct hole, even with a maximum occupancy of the ducts which lead into this duct hole, it is possible to conduct these supply lines entirely through this first duct hole to the opposing side of the cover plate.

In particular, it is provided that at least two cable ducts and/or at least two hose ducts lead into a second duct hole which is set back relative to the edges of the cover plate. The provision of such a second duct hole which is spaced apart from the first duct hole makes it possible to provide such through-passages for a plurality of supply lines respectively at different points of the cover plate. Moreover, by such an embodiment, therefore, the management of the length of the respective ducts is also optimized and thus also the respective supply lines laid therein are optimized in terms of their length. As a result, the management of the layout of the supply lines is designed to be particularly advantageous. In particular, by at least two such duct holes, into which in each case a plurality of ducts lead, it is advantageously achieved that a particularly large duct hole, into which all of the ducts lead, is not required. As a result, the stability of the cover plate, in particular with regard to torsional stiffness, is also maintained at a high level.

Preferably, it is provided that the second duct hole has a diameter which is designed at least for conducting through all of the cables and/or all of the hoses which may be conducted via all of the cable ducts and/or all of the hose ducts to the first duct hole. The advantages to be achieved relative thereto have already been mentioned in the corresponding embodiment of the first duct hole.

In an advantageous embodiment it is provided that the cover plate also integrates an electronics receiver for receiving an electronics module. In addition to very different supply lines, in this context an electronics module may also be directly arranged on the cover plate. The functionality of the cover plate as a carrier for different components is further increased thereby. In particular, a space-saving arrangement of this electronics module is also possible and supply lines to this electronics module which are particularly short may be produced.

Preferably, it is provided that the hose duct has a first end which leads into a duct hole. The hose duct has an opposing second end which leads into a through-passage through the cover plate, wherein the through-passage has a diameter which is smaller than the diameter of the duct hole. In particular, the through-passage has a diameter through which only the hose laid in the hose duct may be conducted. As a result, therefore, the hose may be particularly advantageously conducted at specific points of the cover plate to a unit to be connected thereto and in this context may also be held very accurately in the through-passage in terms of positioning. Undesired wobbling or slippage due to an undesirably large through-passage is prevented thereby. By the small and adapted dimensioning of the through-passage relative thereto, on the other hand, the stability of the cover plate remains high even if a plurality of such hose ducts are respectively configured with corresponding through-passages at the second ends.

Preferably, it is provided that a cable duct and/or a hose duct leads into a rear edge of the cover plate. Thus a supply line may be laid via this rear edge of the cover plate, so that in this context a downward through-passage does not have to be configured.

In a further advantageous embodiment, it is provided that a plurality of ducts, which may encompass both cable ducts and hose ducts, may be configured in a linear manner over at least one third of their length, preferably over at least half of their length. As a result, the shortest possible paths of the ducts are formed, whereby in turn advantages may also be achieved with regard to a clear layout situation and the shortest possible direct layout of the respective functional unit is permitted in the household appliance. As a result, the shortest possible lengths for electrical cables and hoses are also permitted.

In particular, it is provided that a plurality of cable ducts and/or a plurality of hose ducts over at least a third of their length, preferably over at least half of their length, are arranged so as to extend parallel to one another and/or are designed to extend parallel to a rear edge of the cover plate.

It may be provided that a duct is designed both as a cable duct and as a hose duct, so that in such a duct both at least one electrical cable and at least one hose may be laid together.

In an advantageous embodiment, it is provided that a hose duct is inclined and thus, in particular, has an inclined base. A specific drainage channel for a liquid medium which is conducted in a hose is permitted thereby. Especially if leakages occur, the escaping water may be specifically diverted via the orientation of the inclination of the hose duct at a defined point. The collection of such leakage water, therefore, is possible in a very expedient manner and other components are prevented from being functionally impaired by this leakage water, in particular electronics components are not wetted by this leakage water.

In a further advantageous embodiment, it may be provided that the ducts intersect and are configured at different vertical positions in the cover plate. Thus, for example, it may be provided that a duct located at a higher point intersects with a duct located at a lower point, wherein both ducts are also designed to be open at this intersection point to the top side of the cover plate. As a result, it is possible for both ducts to be provided in a simple manner with corresponding supply lines and a design of the ducts which is very neat and space-saving is possible. These ducts may thus also be designed to be very short, so that correspondingly the supply lines may also be kept short. Such a stacked management of the layout by the respective embodiment of the different vertical positions of the intersecting ducts may be provided both for at least two hose ducts and for at least two cable ducts and for one hose duct and one cable duct.

In a further advantageous embodiment, it may be provided that a duct, in particular a hose duct, is increased in its width over at least one portion of its longitudinal extent and as a result is widened. This widened region may be configured, for example, at one end of such a duct. The widening may be designed, in particular, to be funnel-shaped. By such a widened region of a duct, especially if it is configured as a hose duct, it is possible to receive an excess length of the hose.

Preferably, a cable duct and/or a hose duct has at least one region which is configured, in particular, to be funnel-shaped. As a result, desired excess lengths of a cable or a hose may be stowed as required.

The invention further relates to a household appliance which has a water-conducting subassembly and which has a cover plate according to the invention or an advantageous embodiment thereof. The household appliance is, in particular, a household refrigeration appliance which preferably also has a dispenser for dispensing liquid and/or shaped ice elements. This dispenser thus represents a water-conducting subassembly which correspondingly has to be supplied with water. This is carried out via hoses which are laid in the household refrigeration appliance and are then conducted to this water-conducting subassembly. Water in this case is preferably supplied via an external mains water supply and is conducted via a distribution unit, which is also connected to at least one hose, to this water-conducting subassembly. The cover plate is preferably arranged as an upper closure of an intermediate space in which thermally insulating material, in particular insulating foam, is incorporated. The intermediate space in this case is preferably defined by an internal container, the walls thereof defining a receiver space for food of the household refrigeration appliance, and this cover plate in the upper region of the household refrigeration appliance.

It may preferably be provided that the cover plate is covered toward the top by an additional separate top plate, for example made of sheet metal. By means of this embodiment, therefore, the ducts of the cover plate which are open to the top side and thus on the side remote from this cited intermediate space are also covered by this separate top plate. Preferably, this top plate is positioned directly on the top side of the cover plate.

The household appliance preferably comprises a strip-like faceplate which is separate from the cover plate on the front side and which also covers the cover plate on the front side. In particular, this strip-like faceplate is connected, in particular latched, to the cover plate. In this context, a latching connection represents a connecting device which is mechanically very stable and, in particular, is able to be rapidly assembled and dismantled. In this context, this connecting device does not require any further separate connecting means, such as screws or the like, but on the other hand permits a high level of positional fixing of the components to one another. Undesired slippage of the connected components is also permanently prevented thereby. Especially in the case of a household refrigeration appliance after the assembly of the cover plate and the faceplate, if thermally insulating material is incorporated in the aforementioned intermediate space, and especially in the case of swelling and/or foaming of the insulating foam, the position between these two components is not undesirably altered due to this mechanical connection of the aforementioned components.

Preferably, this strip-like faceplate is connected to the housing of the household refrigeration appliance, in particular screwed thereon. The faceplate is preferably an L-shaped angle section.

The invention further relates to a method for assembly of a cover plate on a household appliance, said cover plate being designed according to the invention or an advantageous embodiment thereof, wherein the cover plate is latched to a strip-like faceplate and the strip-like faceplate is then screwed to a housing of the household appliance. As a result, a specifically designed cover plate may be connected in a manner which is rapid and reliable in terms of position to a further component which then in turn is also fastened to a further different component of the household appliance. A very stable positioning and retention of the individual parts relative to one another, as have been cited above, is thus achieved. However, the assembly is possible in a manner which is very rapid and with reduced effort.

After the assembly of this cover plate and the strip-like faceplate, in a household appliance designed as a household refrigeration appliance, a thermally insulating material is incorporated in an intermediate space between the cover plate and an internal container. In particular, subsequently thereto the electrical cables and hoses are laid in the respective ducts in the cover plate and connected to the respective functional units of the household appliance. After the cables and hoses have been laid, a separate top plate is placed from the top onto the cover so that the cover is covered from the top. The ducts and the supply lines laid therein are thus no longer visible.

The positions and orientations provided when the appliance is used as intended and arranged as intended and when an observer is standing, in particular, in front of the appliance and is looking in the direction of the appliance are specified by the terms "top", "bottom", "front", "rear", "horizontal", "vertical", "depth direction", "width direction", "height direction", etc.

Further features of the invention are disclosed from the claims, the figures and the description of the figures. The features and combinations of features cited above in the description and the features and combinations of features cited hereinafter in the description of the figures and/or shown individually in the figures are not only able to be used in the respectively specified combination but also in other combinations without departing from the scope of the invention. Thus embodiments of the invention, which are not explicitly shown and described in the figures but are disclosed and are able to be produced by separate combinations of features from the described embodiments, are to be regarded as encompassed and disclosed.

Embodiments and combinations of features which thus do not have all of the features of an originally formulated independent claim may be regarded as disclosed. Embodiments and combinations of features which go beyond or deviate from the combinations of features set forth in the related claims may be regarded as disclosed, in particular, by the embodiments set forth above.

BRIEF DESCRIPTION OF THE SEVERAL VIEWS OF THE DRAWING

Exemplary embodiments of the invention are described in more detail hereinafter with reference to schematic drawings, in which.

DESCRIPTION OF THE INVENTION

Figure 1:
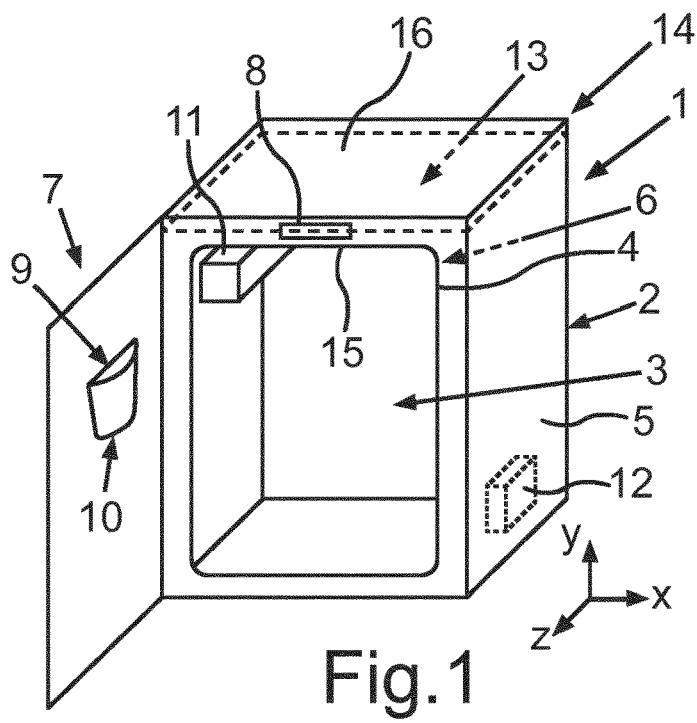
FIG. 1 shows a schematic view of an exemplary embodiment of a household appliance according to the invention.

Elements which are the same or functionally the same are provided with the same reference characters in the figures.

An exemplary embodiment of a household appliance which is designed here as a household refrigeration appliance 1 and thus is designed for storing and preserving food is shown in FIG. 1 in a simplified view. The household refrigeration appliance 1 may be, for example, a refrigerator or a freezer or a combined refrigerator/freezer. This household refrigeration appliance 1 comprises a housing 2 in which at least one receiver space 3 for food is configured. The receiver space 3 may be a refrigeration compartment or a freezer compartment. In a combined refrigerator/freezer two such receiver spaces are present, in particular one thereof being a refrigeration compartment and in particular one thereof being a freezer compartment. The receiver space 3 is defined by walls of an internal container 4. The internal container 4 is surrounded by an external housing 5 and/or arranged in this external housing 5. Thermally insulating material, in particular an insulating foam, is incorporated in an intermediate space 6 between the internal container 4 and the external housing 5.

A door 7, which is designed for closing the receiver space 3 on the front side, is pivotably arranged on the housing 2. The household refrigeration appliance 1 comprises at least one electronics subassembly and/or an electronics module 8 which is arranged in an upper front side flange region of the housing 2 in a position which is to be understood only by way of example. In the closed state of the door 7 this electronics module 8 is concealed by the door 7. Additional further electronics modules may also be installed. This electronics module 8, on the one hand, has to be supplied with electrical energy and, on the other hand, for exchanging signals is connected, in particular, by at least one electrical cable to a control unit of the household refrigeration appliance 1.

Moreover, the household refrigeration appliance 1 also preferably comprises a dispenser 9 as a water-conducting subassembly which is designed for dispensing liquid and/or shaped ice elements. This dispenser 9 comprises a dispensing unit 10 which, in particular, is configured on the door 7 and is configured for dispensing shaped ice elements even when the door 7 is closed. To this end, the dispenser 9 also comprises, in particular, an ice preparation unit 11 which is designed for producing these shaped ice elements. In the exemplary embodiment, the ice preparation unit 11 is arranged outside the door 7 but may also be arranged directly on the door 7. For dispensing liquid as a beverage and/or for dispensing shaped ice elements, this dispenser 9 requires water which has to be correspondingly supplied. To this end, the household refrigeration appliance 1 is preferably connected to an external mains water supply, such as a domestic mains water supply. Via a further water-conducting subassembly 12 which, for example, is arranged in a machine space which is configured in the lower rear region of the household refrigeration appliance 1, this water which is supplied outside the household refrigeration appliance 1 is also conveyed to the dispenser 9. To this end, hoses are provided as connections.

A separate cover plate 13 is arranged in the housing 2, in particular in the intermediate space 6, in the upper region of the household refrigeration appliance 1. The cover plate 13 is integrally designed and preferably made from plastics material.

This cover plate 13 has at least one integrally configured cable duct for an electrical cable and at least one hose duct which is configured separately thereto and integrated therein for a media-conducting hose.

Figure 2:
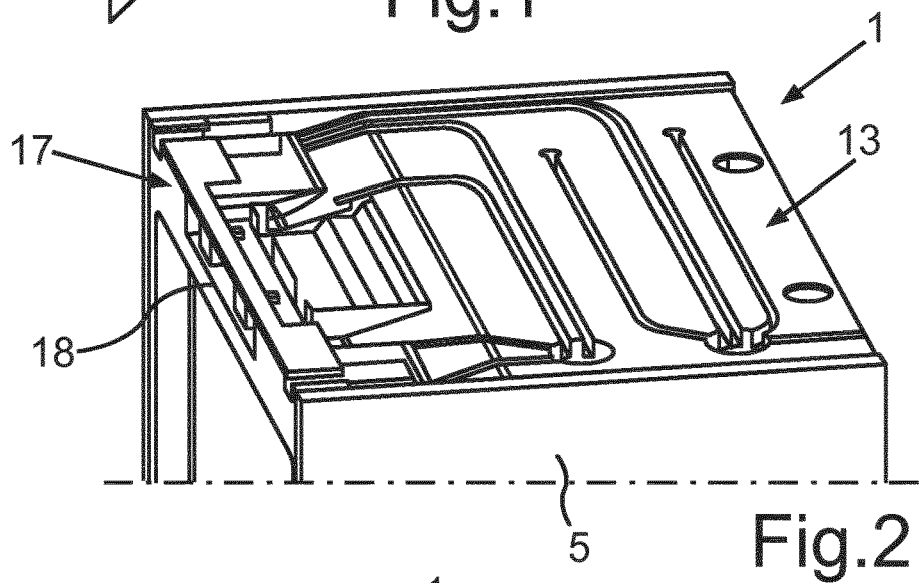
FIG. 2 shows a perspective view of partial components of the household appliance according to FIG. 1.

In FIG. 2 the household refrigeration appliance 1 is shown in the upper partial region, wherein an upper, separate top plate 16 closing the external housing 5 is also removed. The cover plate 13 is arranged in an upper region 14 of the household refrigeration appliance 1 and is arranged above a top wall 15 of the internal container 4 and spaced apart therefrom.

The household refrigeration appliance 1 also comprises a strip-like faceplate 17 which is arranged on the front side and bears on the front side against the cover plate 13. The L-shaped, linear strip-like faceplate 17 thus covers this cover plate 13 on the front side. The faceplate 17 is, in particular, designed integrally and from metal. It is connected, in particular, to the cover plate 13 and in this context latched thereto. Moreover, the faceplate 17 is additionally connected to the external housing 5, in particular screwed thereon. As may be identified, this faceplate 17 has a through-passage 18 on the vertical limbs of the L-shape, the electronics module 8 extending through said through-passage and/or the display unit of the electronics module 8 being able to be viewed through said through-passage on the front side.

Figure 3:
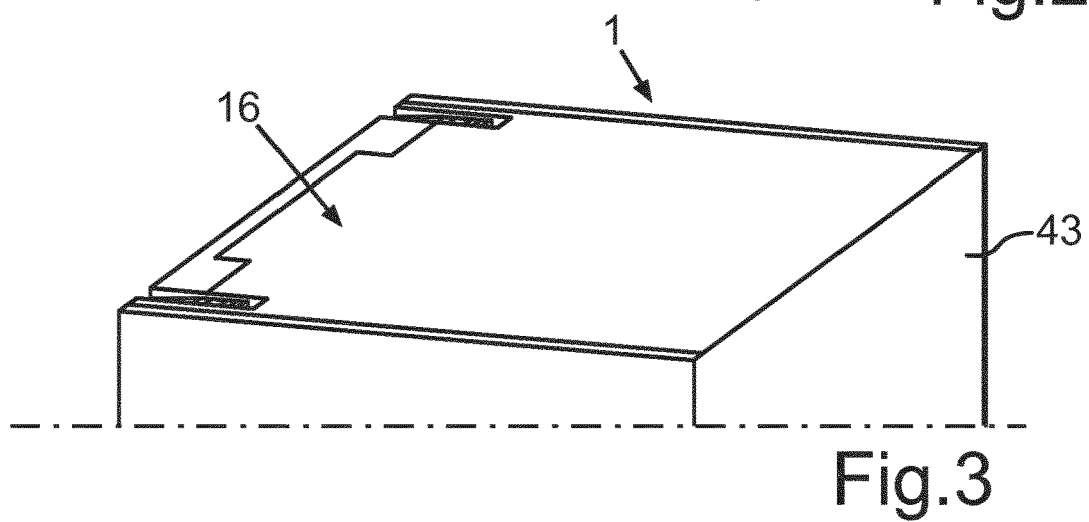
FIG. 3 shows a further perspective view of the household appliance according to FIG. 1 in a partial view.

In FIG. 3 the household refrigeration appliance 1 is shown in a partial view in the upper region, wherein in contrast to the view according to FIG. 2 the separate top plate 16 is arranged in position. As may be identified, therefore, the cover plate 13, which may also be denoted as a carrier plate, is entirely covered from the top. Viewed from the cover plate, the cover plate 13 covers the internal container 4 from the top and thus also forms in this upper region a boundary for the region of the intermediate space 6 into which this insulating foam is incorporated in this upper region of the household refrigeration appliance 1.

Figure 4:
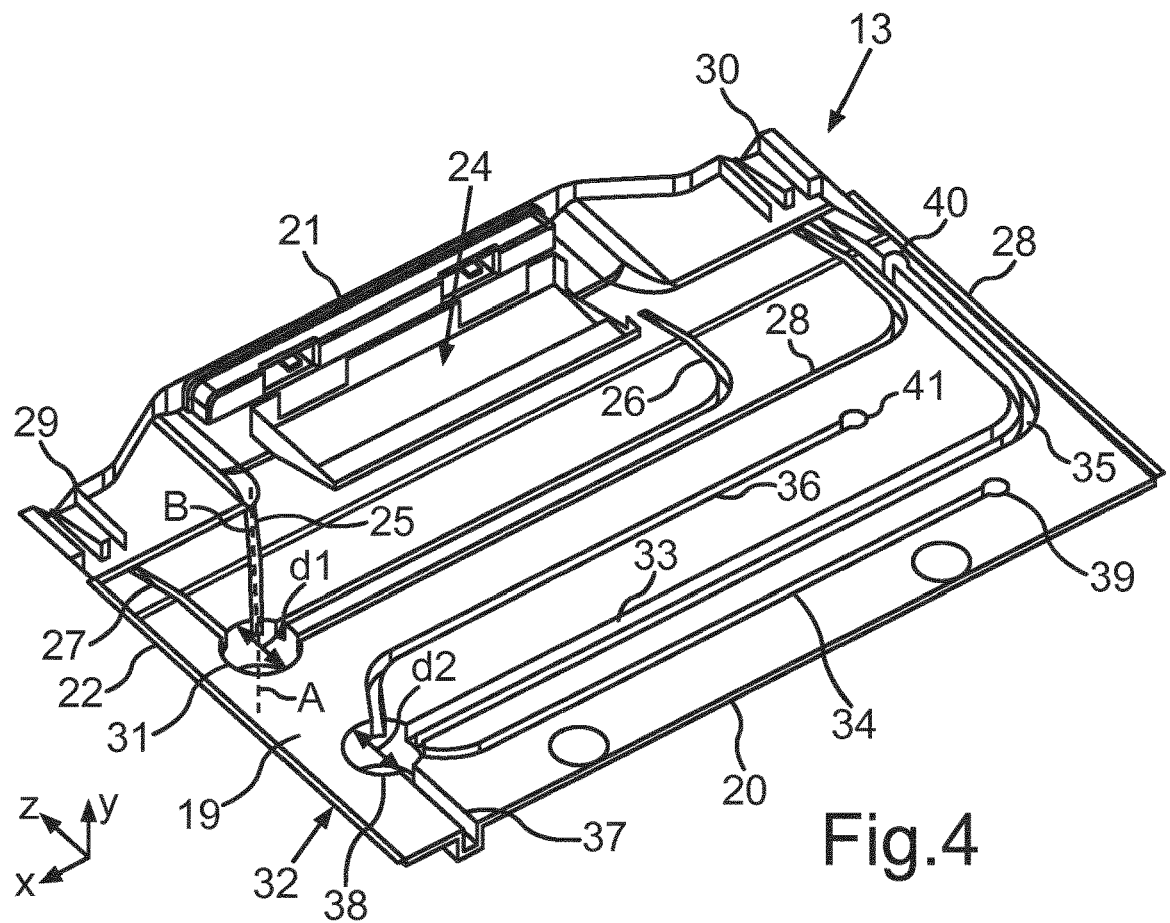
FIG. 4 shows a perspective view of an exemplary embodiment of a cover plate according to the invention for a corresponding household appliance.

An exemplary embodiment of the integral cover plate 13 and/or this carrier plate is shown in FIG. 4 in a perspective view. A plurality of ducts are configured to be integrated on a top side 19 of the cover plate 13 which in the installed state is remote from the intermediate space 6 and thus also the internal container 4. The ducts in each case are configured in the manner of channels, which means that they are not fully closed in the circumferential direction about their respective longitudinal duct axis. The ducts are, in particular, open to this top side 19. As a result, the respective supply lines to be incorporated therein, which may be electrical cables and hoses, may be laid in a particularly simple manner.

The cover plate 13 comprises a rear edge 20, a front edge 21 opposing this rear edge and two opposing side edges 22 and 23. In the exemplary embodiment, at least one electronics compartment is also configured to be integrated in the cover plate 13 on this top side 19, said electronics compartment being designed to receive the electronics module 8. This electronics compartment and/or this electronics receiver 24 is also open to the top so that the insertion of the electronics module 8 and thus the provision of the cover plate 13 with the electronics module 8 may be carried out in a particularly simple manner.

Two cable ducts 25 and 26 are conducted to this electronics receiver 24. Moreover, further cable ducts 27 and 28 are provided, said further cable ducts being conducted to further electronics receivers 29 and 30 in which further electronics units may also be positioned. As may be identified, these cable ducts 25 to 28 lead into a first duct hole 31 which is designed to be continuous and thus forms a connection between the top side 19 and a lower side 32 of the cover plate 13. A diameter d1 of this first duct hole 31 is dimensioned such that all electrical cables which are laid in the cable ducts 25 to 28 may be conducted through together. The first duct hole 31 is configured spaced apart from all edges 20 to 23 of the cover plate 13 and thus is entirely defined by a duct wall in the circumferential direction about a hole axis A of the first duct hole 31.

The cable ducts 25 and 27 are linear, whereas the cable ducts 26 and 28 extend in an L-shaped manner. Relative to the opening of a duct to the top side 19, which has already been described, this is explained with reference to the cable duct 25. This cable duct has a longitudinal cable axis B and the cable duct 25 is not fully closed in the circumferential direction around this longitudinal cable axis B but open to this top side 19. Preferably, the same also applies to the other ducts which have already been described and will be described in more detail below.

Further ducts are also configured to be integrated in the cover plate 13, wherein hose ducts 33, 34, 35, 36 are configured here. Moreover, a further duct is provided, said further duct being configured, in particular, as a hose duct 37 and leading into the rear edge 20 of the cover plate 13. In particular, it is provided that these hose ducts 33, 34, 35, 36 and 37 lead to a second duct hole 38 which is configured to be spaced apart from the first duct hole 31. Also in this case, this second duct hole 38 is arranged spaced apart from all edges 20 to 23 of the cover plate 13 and also in this case, therefore, the contour of the second duct hole 38 is fully closed in the circumferential direction around a hole axis. Moreover, a connection between the top side 19 and the lower side 32 of the cover plate 13 is formed through this second duct hole 38. Thus in each case supply lines in the form of electrical cables or hoses may be conducted through the cover plate 13 and thus conducted from one of the two sides 19, 32 to the other side 32, 19. Also in this case a diameter d2 of the second duct hole 38 is dimensioned such that all supply lines in the form of electrical cables and hoses laid in the ducts leading into the second duct hole 38 pass at the same time through the second duct hole 38.

As may be identified, when viewed from the front side and thus in a negative z-direction which also represents the depth direction of the household refrigeration appliance 1, the two duct holes 31 and 38 are configured in a right-hand half of the cover plate 13. They are also configured in the two rear thirds of the entire depth which is measured in the z-direction of the cover plate 13. In this depth direction, these duct holes 31 and 38 are also arranged further to the rear than at least the electronics receiver 24, in particular all of the electronics receivers 24, 29 and 30.

It may be identified that a plurality of the ducts extend over a relatively long length, in particular over at least half of their length, parallel to one another and in a linear manner and, in particular, parallel to a rear edge 20.

In particular, the hose ducts 34, 35 and 36 have at the second ends which oppose the ends which lead into the duct hole 38, in particular, in each case a further through-passage 39, 40 and 41, through which the hose laid in the respective hose duct 34, 35 and 36 is conducted again through the cover plate 13 and thus from the top side 19 to the lower side 32. In particular, it is provided here that the hoses which are conducted upwardly from the water-conducting subassembly 12 extend through this duct hole 38, are laid in the hose ducts 34, 35 and 36 and then in the through-passages 39, 40 and 41 are again laid in the downward direction in order to be able to be conducted to the dispenser 9. By means of the embodiment, the position and the geometry of the aforementioned ducts and also by means of the duct holes 31 and 38, a management of the layout of the supply lines may be implemented which is very neat and clear and in this context very short paths may also be formed for these supply lines.

Figure 5:
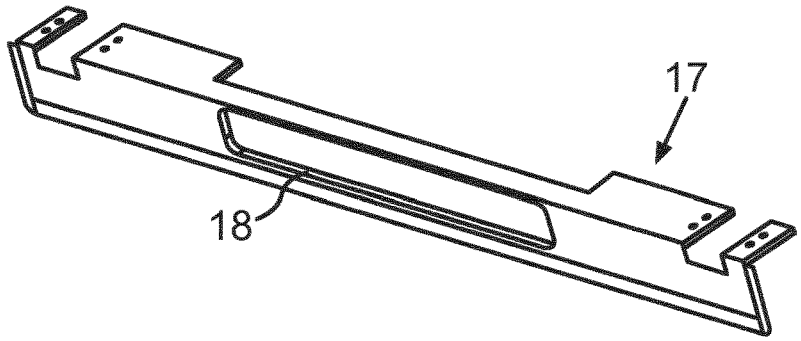
FIG. 5 shows a perspective view of a strip-like faceplate.

In FIG. 5 the already-described faceplate 17 is shown in a perspective view. In particular, corresponding latching elements which are then latched to counter latching elements on the cover plate 13 are also provided here.

Figure 6:
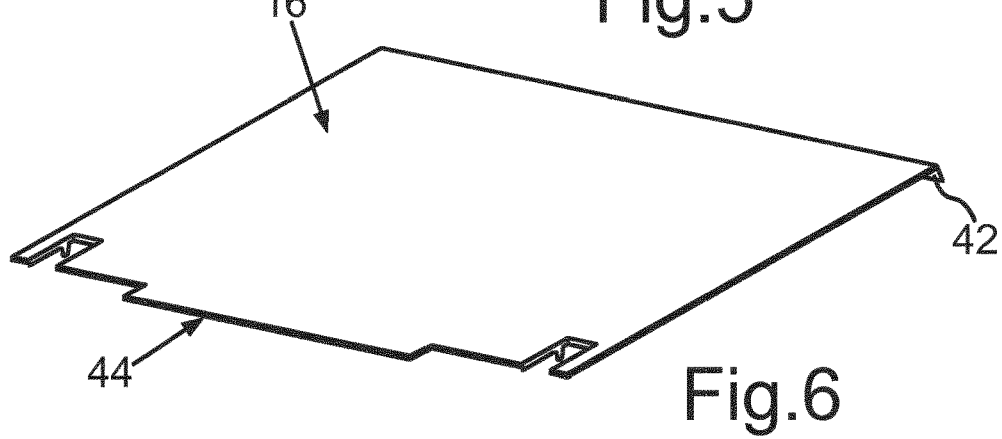
FIG. 6 shows a perspective view of a top plate which is separate from the cover plate.

In FIG. 6 a perspective view of the top plate 16 is also shown. This top plate has in the rear region a downwardly curved projection 42 which, in particular, is provided for connecting to a rear wall 43 (FIG. 3) of the external housing 5. Configured in a front edge 44 of the top plate 16 are a plurality of structures which are thus provided for connecting to the faceplate 17, in particular plug connections or latching connections may also be provided here.

Figure 7:
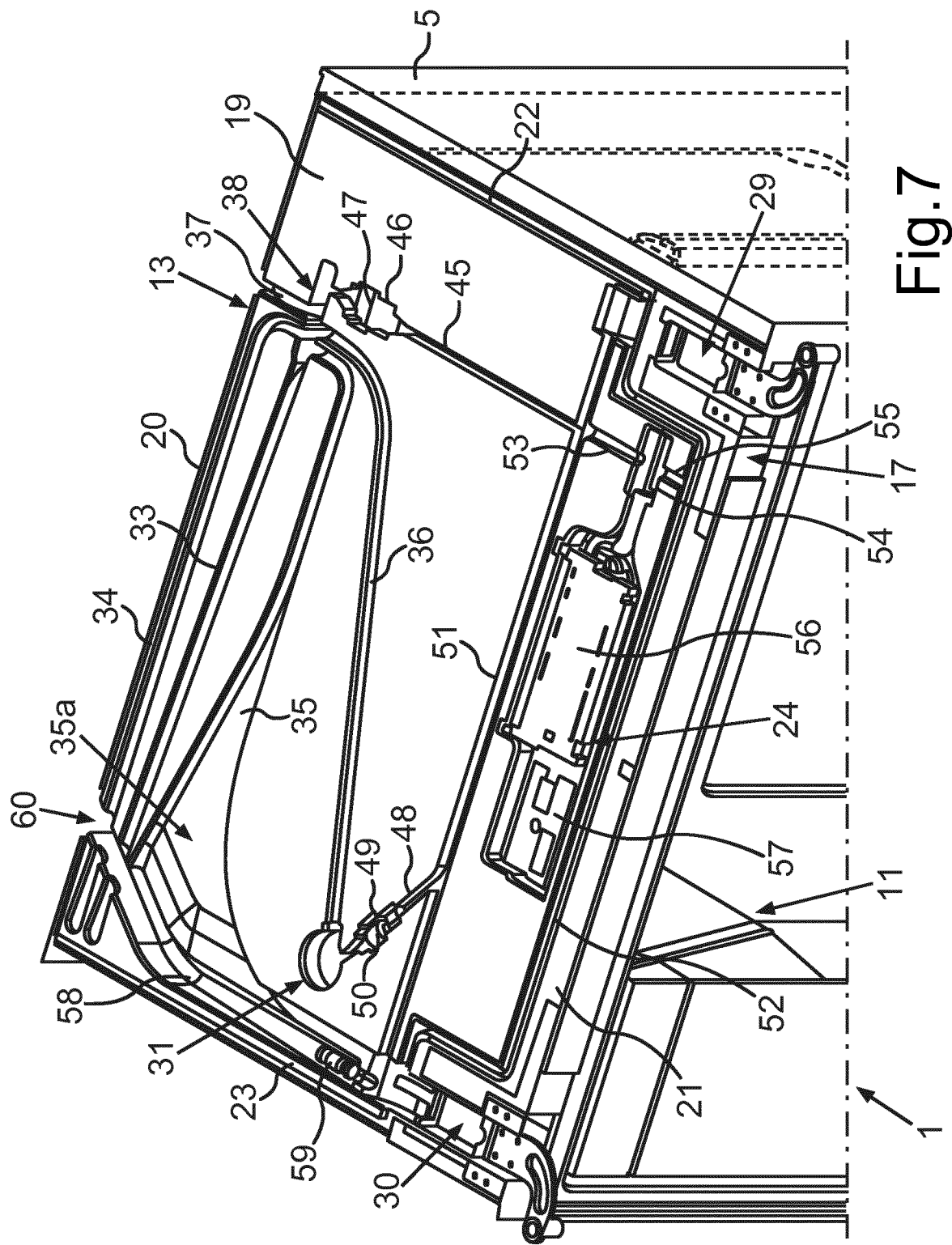
FIG. 7 shows a perspective view of partial components of a further exemplary embodiment of a household appliance.

In FIG. 7 in a further perspective partial view the household refrigeration appliance 1 is shown with some components according to a further exemplary embodiment. In this perspective plan view of the household refrigeration appliance 1, once again as in FIG. 2 the top plate 16 is removed. The cover plate 19 is shown here in a further embodiment which is different from the previous embodiments. Also in this case a plurality of ducts are configured on the top side 13, both electrical cables and hoses being able to be laid therein.

In this embodiment, once again a second duct hole 38 is provided into which a plurality of hose ducts leads. Also in this case hose ducts 33, 34, 35 and 36 are once again provided, said hose ducts leading into this second duct hole 38 and extending over a correspondingly long length in the width direction of the cover plate 13 and thus also in the width direction (x-direction) of the household refrigeration appliance 1.

The hoses which may be laid therein are also conducted in this case to different components of the household refrigeration appliance 1, for example to a water-dispensing unit in the appliance, a water-dispensing unit outside the appliance, an ice preparation unit 11 in the housing 2 or an ice preparation unit which is entirely arranged in the door 7.

Moreover, optionally according to corresponding variants, different paths are required for laying the hoses, in particular relative to the position of the ice preparation unit 11. In particular, it is provided that a water tank is arranged below the second duct hole 38 in the housing 2, preferably substantially in the vertical direction and thus in the height direction (y-direction), the respective hoses which may then be laid at least in some of the hose ducts 33 to 36 being conducted to said water tank.

The hose duct 37 is also configured here once again, said hose duct leading into the rear edge 20.

In the exemplary embodiment shown here, a cable duct 45 also leads into this second duct hole 38 and extends substantially parallel to the side edges 22 and 23 of the cover plate 13. This cable duct 45 is also configured such that it has a receiver 46 into which a plug 47 may already be directly positioned. The provision of different cables, therefore, is possible in the cover plate 13, since in this receiver 46 a connection to a further cable and also to a plug is possible by means of the plug 47. Due to the recessed and/or embedded position of the plug 47, a positionally secure arrangement and protection for this plug 47 may also be achieved here, but also a compact construction of the household refrigeration appliance 1 is thus promoted.

A further cable duct 48 which leads into the first duct hole 31 is provided. A receiver 49 for a plug 50 may also be provided here.

A further cable duct 51, which is oriented in the width direction and which extends in a linear manner and leads into the electronics receiver 29 and 30, is also provided. In particular, it is provided that the cable ducts 45 and 48 lead into this further cable duct 51.

A further cable duct 52, which extends parallel to the front edge 21 of the cover plate 13 and also extends spaced-apart and parallel to the side edges 22 and 23, is also configured. This cable duct 52 which, when viewed in the depth direction represents the cable duct on the front side, is also configured to be pot-shaped and/or U-shaped when viewed in plan view. A further cable duct 53 which leads into the cable duct 51 is provided. In particular, the cable duct 53 is configured in a linear extension of the cable duct 45 and extends on the opposing side of the cable duct 45, when viewed relative to the cable duct 51.

In this case, the cover plate 13 comprises a further third duct hole 54, this further cable duct 53 leading therein. A further cable duct 55 which leads into the cable duct 52 is provided. Moreover, this cable duct 55 also leads into the further duct hole 54. This cable duct 55 is also designed in the linear extension of the cable duct 53 which leads into the duct hole 54 on the opposing side of the cable duct 55.

In FIG. 7 in the electronics receiver 24, an arrangement of an electronics module 56 which is also arranged embedded therein is shown by way of example. The electronics module 56 may, for example, be a control unit for the ice preparation unit 11. Additionally or alternatively thereto, a further electronics module 57 may also be arranged in the electronics receiver 24. This further electronics module 57 which is preferably present, for example, may be power electronics for illuminating the household refrigeration appliance 1.

Preferably, electrical plugs may be arranged in the electronics receivers 29 and 30.

A further advantageous embodiment is shown in FIG. 7, such that at least one of the hose ducts, in this case in particular the hose duct 35, has a variable duct width along its longitudinal duct axis. In particular, it is provided here that the hose duct 35 is widened on its side remote from the duct hole 38 and thus at an end remote from the duct hole 38 relative thereto. In particular, this widening and/or the widened region 35 is configured to be funnel-shaped.

This region 35a which is enlarged in terms of width and which, in particular, is configured to be funnel-shaped, may also be configured in a further hose duct 33, 34, 36, 37, 58. By means of this embodiment of a hose duct with such a region 35a, it is possible to store an excess length of a hose laid therein. By such an excess length the assembly and dismantling may be simplified, in particular if this hose is then conducted to components of the household refrigeration appliance 1 which are also able to be dismantled. This may be the case, for example, in a door 7. By such a provision of an excess length of the hose, therefore, these assembly and dismantling scenarios may be simplified, in particular without the respective hose having to be detached and/or decoupled. In this region 35a, therefore, a specific storage space is also formed for the relevant excess length of the hose laid therein.

In the exemplary embodiment according to FIG. 7, a further hose duct 58 is configured, said hose duct also preferably leading into the rear edge 20 and preferably leading into an electronics receiver 30 configured in the region of the front edge 21.

Both in the embodiment according to FIG. 7 and in the embodiment according to FIG. 2 and FIG. 4 it is provided that at least one hose duct 33 to 37, 58 is at least partially inclined and thus a corresponding duct base does not run entirely horizontally. By means of such an embodiment, a hose duct is also designed as a drainage channel in a specific direction so that if a leakage were to occur in a hose laid therein, the water leaking out is able to drain specifically into the respective hose duct 33 to 37, 58. As a result, it is achieved that electrical cables and/or electronics modules, which are optionally arranged adjacent thereto, do not come into contact with this liquid which leaks out and thus the relevant functionality is not impaired. For example, a specific removal of this water caused by leakage may thus be carried out in the direction of a duct hole and/or to the rear edge 20.

A hose connector 59 which is arranged, for example, in the hose duct 58 is also shown in FIG. 7 by way of example. A hose laid in the hose 58 or the hose 35 may be coupled to the hose connector 59.

Moreover, in the exemplary embodiment in FIG. 7, but not limited thereto, it is also provided that hose ducts may also be configured at different vertical positions in the cover plate 13, and relative thereto may also intersect so that hoses in the respective intersecting hose ducts may be conducted easily past one another at different heights. Such an intersection point and/or intersection 60 is shown in FIG. 7. In this case, by way of example the hose ducts 33, 34 are conducted via the hose duct 58 which is located at a lower point relative thereto so that hoses are laid in the hose ducts 33 and 34 above a hose which is laid in the hose duct 58. Such a stacked layout of the relevant hoses permits short paths and a compact construction. Extensive layout paths may also be managed easily by such intersections. Additionally or alternatively, the same may be provided for cable ducts in which the cables may be conducted one over the other in the height direction.

In particular, it is also provided that a cover plate 13, as has been described above with reference to the exemplary embodiments, may be used as the same component for a plurality of embodiments of a household refrigeration appliance 1. In this context, corresponding cable ducts and hose ducts may be already provided, according to variants said ducts optionally not all being occupied and, according to an installation in a specific type of household refrigeration appliance, only specific cable ducts and/or specific hose ducts being occupied with the respective supply lines in the form of an electrical cable or a hose.

In particular, it is provided that the cover plate 13 has a surface area which corresponds at least to 90 percent of the surface area of the household refrigeration appliance 1 in a plan view and thus in a horizontal plane (x-z plane).

Figure 8:
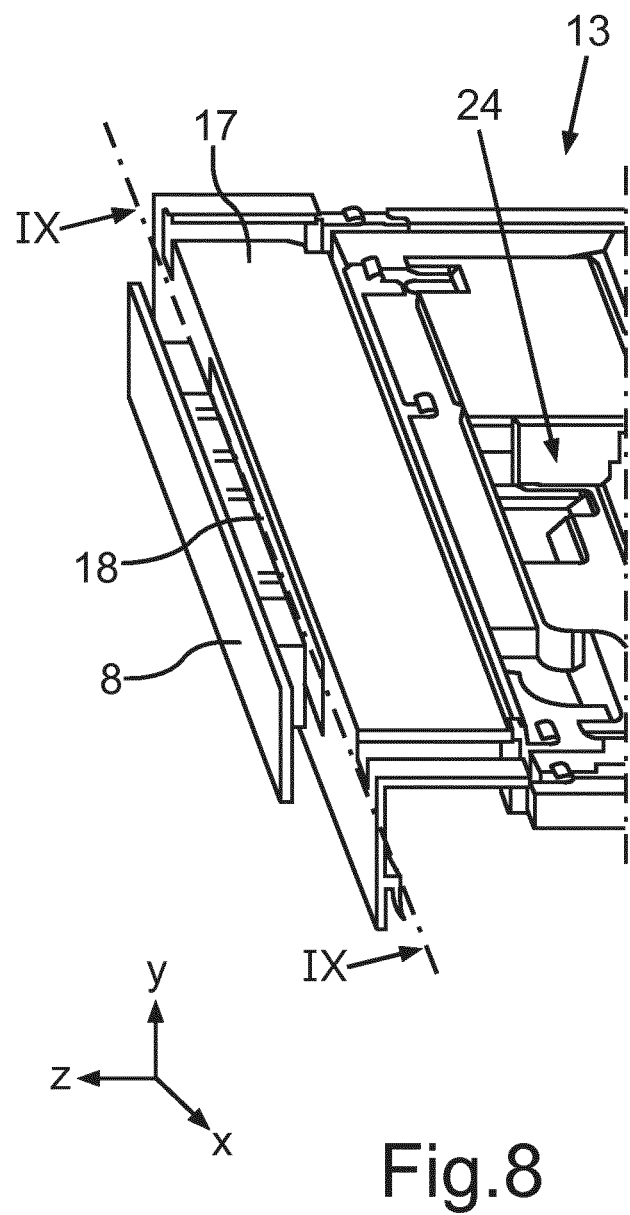
FIG. 8 shows a perspective view of a cover plate with a faceplate and an electronics module.

In FIG. 8, the cover plate 13 is shown in the connected state to the faceplate 17 in a perspective partial view. The electronics module 8, however, is also shown in an exploded view in FIG. 8 and not yet inserted in the through-passage 18. As already mentioned above, the faceplate 17 is latched to the cover plate 13.

Figure 9:
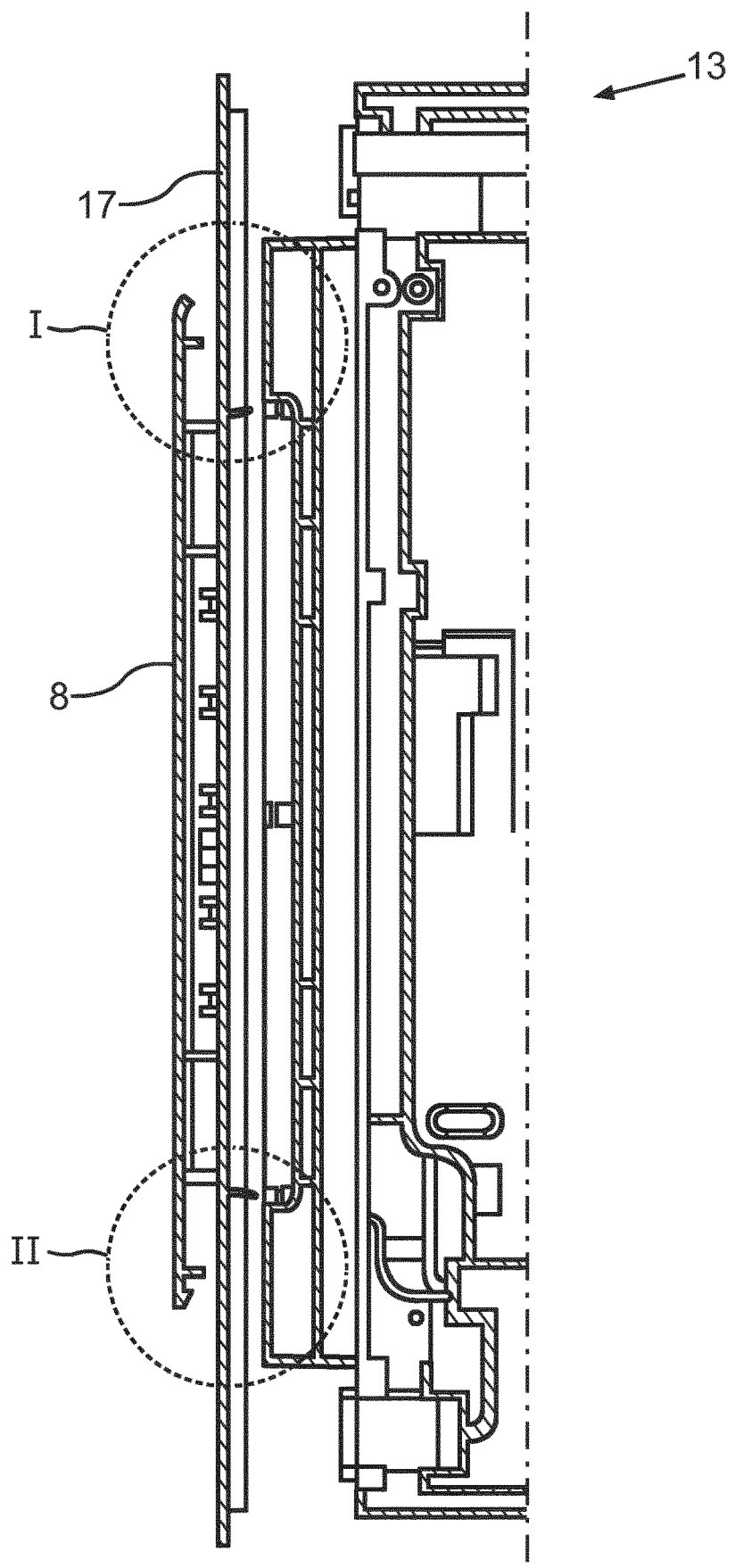
FIG. 9 shows a sectional view through the view in FIG. 8.

In FIG. 9 a sectional view of the components according to FIG. 8 along the cutting line IX-IX in FIG. 8 is shown. The cutting plane is thus in the x-z plane.

Figure 10:
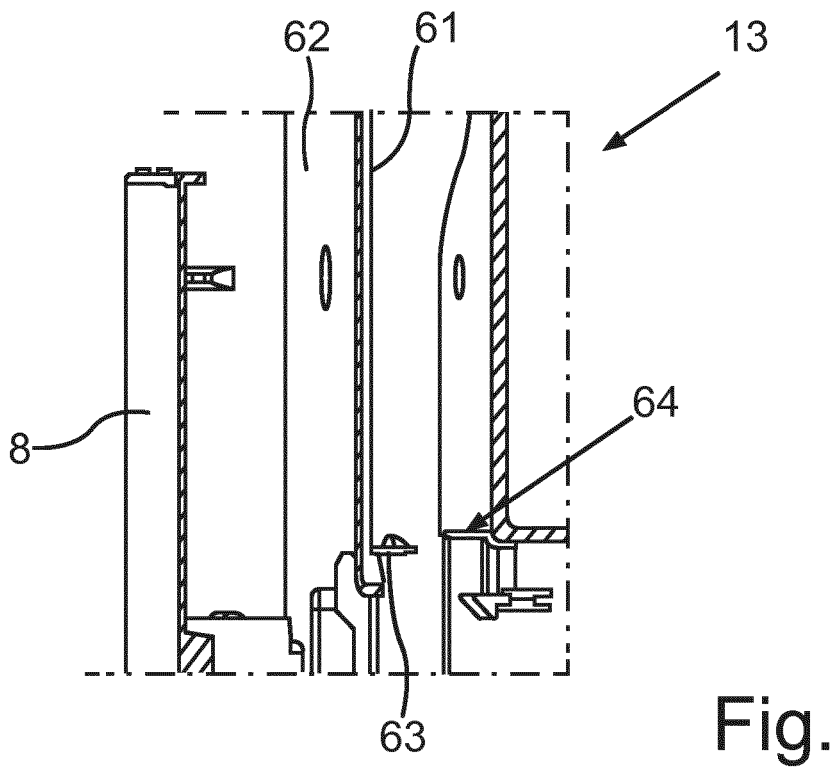
FIG. 10 shows an enlarged view of a partial region in FIG. 9.

As may be identified in FIG. 10 in the enlarged view of the partial region I in FIG. 9, latching elements 63 which protrude to the rear are configured on a rear face 61 of the vertical limb 62, said latching elements then being latched to the cover plate 13. In particular, a latching and/or engagement behind a counter latching element 64 is provided here.

Figure 11:
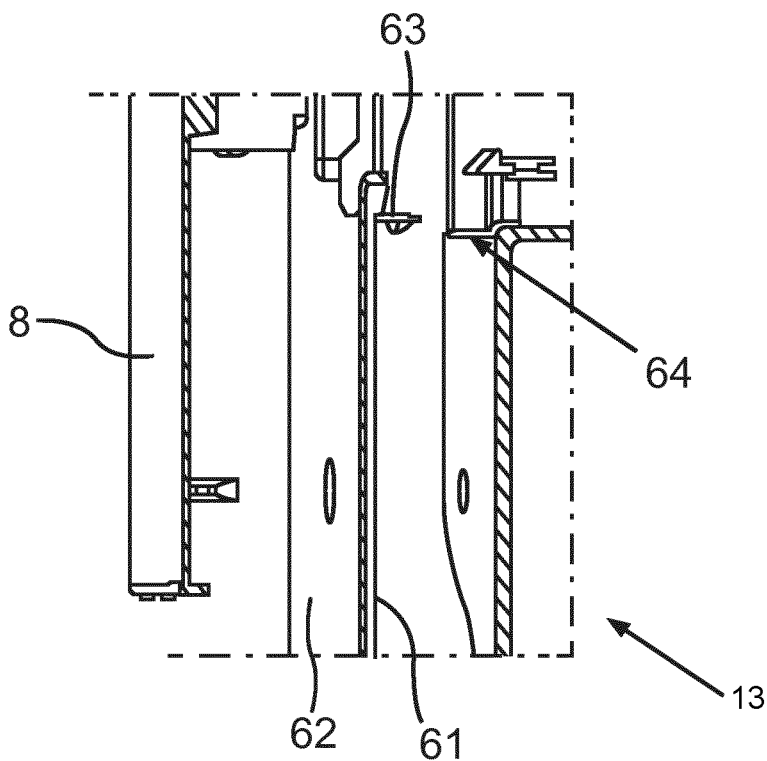
FIG. 11 shows an enlarged view of a further partial region in FIG. 9.

In FIG. 11 the partial region II in FIG. 9 is shown in an enlarged partial view. A corresponding embodiment with a latching element 63 and a counter latching element 64 is also shown here. By means of these at least two latching elements 63 and the counter elements 64 and, in particular, also the orientation and local position thereof, a positionally secure arrangement of the components latched together may also be achieved relative to one another.

Figure 12:
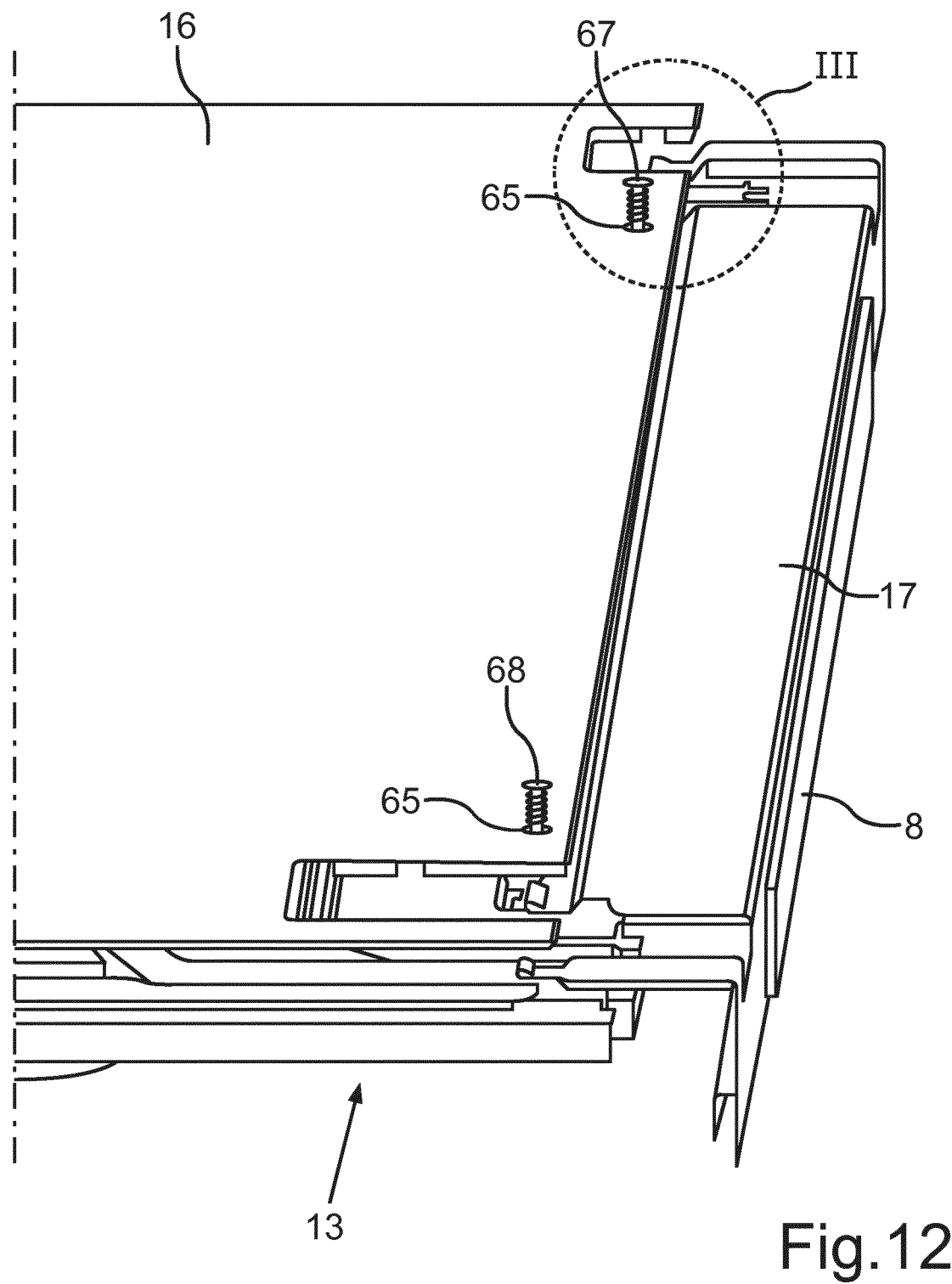
FIG. 12 shows a perspective view of components according to FIGS. 8 to 11 and additionally with a top plate.

In FIG. 12 the embodiment according to FIG. 8 is shown in a further perspective view, wherein here the electronics module 8 is already inserted in the through-passage 18. Additionally, the top plate 16 is also still arranged in position here. The screw connection which has been already described above is not yet completed here but is already indicated, wherein two screw holes 65 and 66 are provided here in the top plate 16, screws 67 and 68 then extending through said top plate. As may be identified in the enlarged partial view of the partial region III in FIG. 12, thus in the enlarged perspective sectional view, the cover plate 13 has a dome 69 into which the screw 67 is screwed and thus a connection with the cover plate 13 is also produced.

Figure 13:
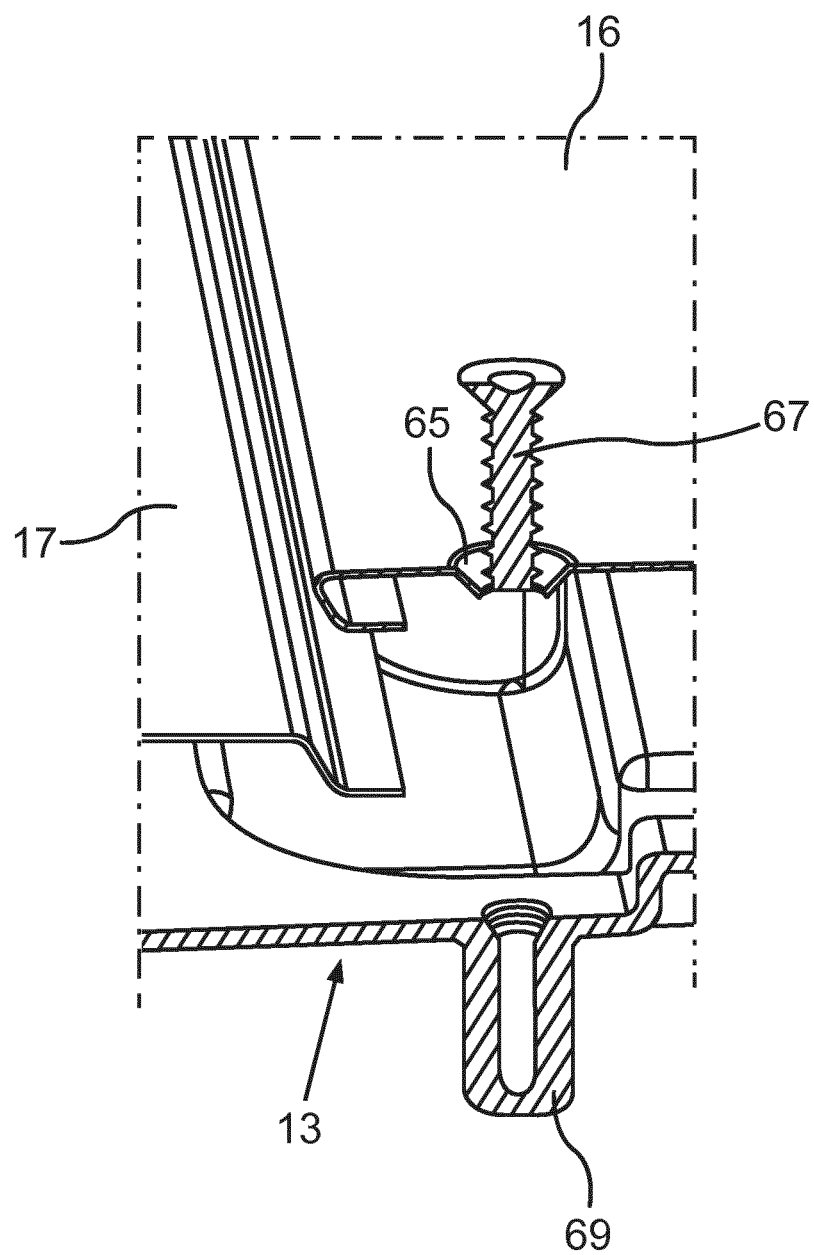
FIG. 13 shows a perspective sectional view through a partial region in FIG. 12.

In FIG. 13 the reverse view to FIG. 12 is shown, so that when viewed in FIG. 13 the faceplate 17 is arranged partially to the rear and the top plate 16 to the front.

LIST OF REFERENCE CHARACTERS

1 Household refrigeration appliance
2 Housing
3 Receiver space
4 Internal container
5 External housing
6 Intermediate space
7 Door
8 Electronics module
9 Dispenser
10 Dispensing unit
11 Ice preparation unit
12 Subassembly
13 Cover plate
14 Upper region
15 Top wall
16 Top plate
17 Faceplate
18 Through-passage
19 Top side
20 Rear edge
21 Front edge
22 Side edge
23 Side edge
24 Electronics compartment
25 Cable duct
26 Cable duct
27 Cable duct
28 Cable duct
29 Electronics receiver
30 Electronics receiver
31 First duct hole
32 Lower side
33 Hose duct
34 Hose duct
35 Hose duct
35a Region
36 Hose duct
37 Hose duct
38 Second duct hole
39 Through-passage
40 Through-passage
41 Through-passage
42 Projection
43 Rear wall
44 Front edge
45 Cable duct
46 Receiver
47 Plug
48 Cable duct
49 Receiver
50 Plug
51 Cable duct
52 Cable duct
53 Cable duct
54 Duct hole
55 Cable duct
56 Electronics module
57 Electronics module
58 Hose duct
59 Hose connector
60 Intersection
61 Rear side
62 Vertical limb
63 Latching element
64 Counter latching element
65 Screw hole
66 Screw hole
67 Screw
68 Screw
69 Dome
d1 First diameter
d2 Second diameter
A Hole axis
B Longitudinal cable axis

The invention claimed is:

1. A one-piece cover plate for a household appliance, the cover plate comprising:
    a top side of the cover plate;
    at least one integrated cable duct formed in the one-piece cover plate for receiving an electrical cable, said at least one cable duct being open to said top side of the cover plate in a circumferential direction about a longitudinal duct axis; and
    at least one hose duct formed in the one-piece cover plate for receiving a hose.

2. The cover plate according to claim 1, wherein said at least one hose duct is open to said top side of the cover plate in the circumferential direction about a longitudinal duct axis.

3. The cover plate according to claim 1, wherein said at least one cable duct includes a plurality of cable ducts and said at least one hose duct includes a plurality of hose ducts.

4. The cover plate according to claim 3, which further comprises opposing edges of the cover plate, at least one of at least two of said cable ducts or at least two of said hose ducts leading into a first duct hole being set back from said opposing edges of the cover plate.

5. The cover plate according to claim 4, wherein said first duct hole has a clear width at least for conducting through at least one of all cables or all hoses which may be conducted through at least one of all of said cable ducts or all of said hose ducts to said first duct hole.

6. The cover plate according to claim 3, which further comprises opposing edges of the cover plate, at least one of at least two of said cable ducts or at least two of said hose ducts leading into a second duct hole being set back from said opposing edges of the cover plate.

7. The cover plate according to claim 6, wherein said second duct hole has a clear width at least for conducting through at least one of all cables or all hoses which may be conducted through at least one of all of said cable ducts or all of said hose ducts to said second duct hole.

8. The cover plate according to claim 1, which further comprises a plug, said at least one cable duct having a widened receiver for receiving said plug and permitting said plug to be introduced and at least partially recessed in said at least one cable duct.

9. The cover plate according to claim 1, wherein said at least one cable duct and said at least one hose duct intersect in at least one intersection at different vertical positions.

10. The cover plate according to claim 1, wherein said at least one cable duct includes at least two cable ducts, said cable ducts being open to said top side and intersecting in at least one intersection at different vertical positions.

11. The cover plate according to claim 1, wherein said at least one hose duct includes at least two hose ducts, said hose ducts being open to said top side and intersecting in at least one intersection at different vertical positions.

12. The cover plate according to claim 1, which further comprises at least one electronics receiver integrated in the cover plate for receiving an electronics module.

13. The cover plate according to claim 1, which further comprises a through-passage passing through the cover plate, said at least one hose duct having a first end leading into a duct hole having clear width and a second end leading into said through-passage, said through-passage having a clear width being smaller than said clear width of said duct hole.

14. The cover plate according to claim 13, wherein said clear width of said through-passage permits only a hose laid in said at least one hose duct to be conducted through said through-passage.

15. The cover plate according to claim 1, which further comprises a rear edge of the cover plate, said at least one hose duct including a hose duct leading into said rear edge of the cover plate.

16. The cover plate according to claim 1, wherein at least one of said at least one cable duct or said at least one hose duct has at least one region being widened in a funnel shape.

17. The cover plate according to claim 1, wherein said at least one hose duct has a hose duct base being at least partially inclined relative to the horizontal.

18. A household appliance, comprising:
    a water-conducting subassembly; and
    a cover plate according to claim 1.

19. The household appliance according to claim 18, which further comprises at least one of a separate strip-like faceplate latched to a front side of the cover plate or a separate top plate covering the cover plate.

20. A method for assembling a one-piece cover plate on a household appliance, the method comprising the following steps:
    providing at least one integrated cable duct in the one-piece cover plate for receiving an electrical cable, the at least one cable duct being open to a top side of the cover plate in a circumferential direction about a longitudinal duct axis;
    providing at least one hose duct in the one-piece cover plate for receiving a hose;
    latching the one-piece cover plate to a strip-shaped faceplate; and
    then screwing the strip-shaped faceplate to a housing of the household appliance.

* * * * *